US010768388B1

(12) United States Patent
Hu et al.

(10) Patent No.: US 10,768,388 B1
(45) Date of Patent: Sep. 8, 2020

(54) CYLINDRICAL OPTICAL FIBER SHUFFLE

(71) Applicant: Fujin Precision Industrial (Jincheng)Co., Ltd., Jincheng (CN)

(72) Inventors: Jian-Wei Hu, Shenzhen (CN); Zhi-Ming Li, Shenzhen (CN); Yao Li, Newark, CA (US)

(73) Assignee: Fujin Precision Industrial (Jingcheng)Co., Ltd., Jincheng (CN)

( * ) Notice: Subject to any disclaimer, the term of this patent is extended or adjusted under 35 U.S.C. 154(b) by 0 days.

(21) Appl. No.: 16/703,014

(22) Filed: Dec. 4, 2019

(30) Foreign Application Priority Data

Nov. 6, 2019 (CN) .......................... 2019 1 1077824

(51) Int. Cl.
| | | |
|---|---|---|
| *G02B 6/44* | (2006.01) | |
| *G02B 6/38* | (2006.01) | |
| *G02B 6/36* | (2006.01) | |
| *G02B 6/28* | (2006.01) | |

(52) U.S. Cl.
CPC ............. *G02B 6/4471* (2013.01); *G02B 6/28* (2013.01); *G02B 6/3616* (2013.01); *G02B 6/3825* (2013.01); *G02B 6/3887* (2013.01); *G02B 6/4403* (2013.01); *G02B 6/4434* (2013.01); *G02B 6/4452* (2013.01)

(58) Field of Classification Search
CPC .......... G02B 6/04; G02B 6/28; G02B 6/3616; G02B 6/3825; G02B 6/3873; G02B 6/3874; G02B 6/3881; G02B 6/3887; G02B 6/4403; G02B 6/443; G02B 6/4434; G02B 6/4446; G02B 6/4452; G02B 6/4471
USPC ............. 385/24, 53, 114, 115, 120, 134–137
See application file for complete search history.

(56) References Cited

U.S. PATENT DOCUMENTS

| | | | | |
|---|---|---|---|---|
| 6,464,404 | B1* | 10/2002 | Robinson ................. | G02B 6/04 385/137 |
| 2003/0031437 | A1* | 2/2003 | Simmons ................. | G02B 6/43 385/121 |
| 2005/0025439 | A1* | 2/2005 | Rubino ................ | G02B 6/4441 385/100 |
| 2008/0002936 | A1* | 1/2008 | Sun ...................... | G02B 6/3608 385/114 |
| 2017/0045700 | A1* | 2/2017 | Conrad .................. | G02B 6/448 |

* cited by examiner

*Primary Examiner* — Michael P Mooney
(74) *Attorney, Agent, or Firm* — ScienBiziP, P.C.

(57) ABSTRACT

An optical fiber shuffle for recombining a plurality of optical fibers of a first optical cable into a second optical cable includes a fixing rod, a first fixing plate, and a second fixing plate. The first fixing plate defines a plurality of first fixing grooves. The first fixing grooves are configured to respectively receive the plurality of optical fibers of the first optical cable. The second fixing plate defines a plurality of second fixing grooves. The second fixing groves are configured to respectively receive the plurality of optical fibers of the first optical cable after the plurality of optical fibers is wound around the fixing rod and recombined into the second optical cable. The first fixing plate and the second fixing plate are respectively located at two ends of the fixing rod.

12 Claims, 8 Drawing Sheets

US 10,768,388 B1

CYLINDRICAL OPTICAL FIBER SHUFFLE

FIELD

The subject matter herein generally relates to optical fiber shuffles, and more particularly to an optical fiber shuffle for recombining a plurality of optical fibers from a first optical fiber cable into a second optical fiber cable.

BACKGROUND

Generally, an optical fiber shuffle is used for recombining a plurality of optical fibers from an incoming optical cable into an outgoing optical cable. In the related art, the optical fiber shuffle has a complicated structure or is prone to problems such as stringing or breaking of the optical fibers.

In the related art, the optical fiber shuffle is usually a rectangular array type wiring structure or a straight-through cross-type heat shrinkable tube packaging structure. The existing optical fiber shuffles are usually adapted for 1×8, 8×8, 16×16 fibers.

However, the rectangular array type wiring structure has no cable (Fiber, Kevlar, jacket) mechanical clamping mechanism, which is prone to abnormalities such as fiber serial movement and breakage. The cables are generally fixed by an adhesive method, the manufacturing process is complicated, and the cost is high. Furthermore, the cables are usually separated as Ribbon cables or Round cables.

BRIEF DESCRIPTION OF THE DRAWINGS

Implementations of the present disclosure will now be described, by way of embodiments, with reference to the attached figures.

DETAILED DESCRIPTION

Figure 1:
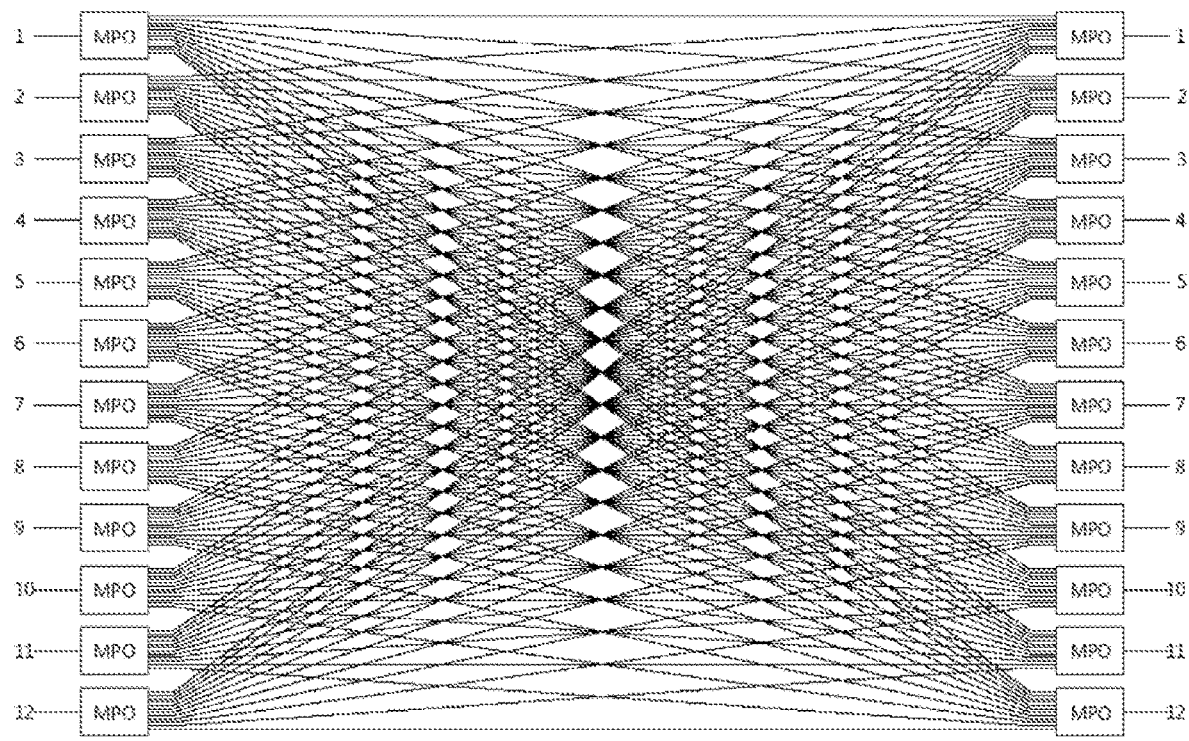
FIG. 1 is a schematic diagram of an operating principle of an optical fiber shuffle in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows a schematic diagram of an operating principle of the present disclosure. The present disclosure relates to an optical fiber shuffle adopting a cylindrical array wiring design for use in an optical communication network. Two ends of the array are connected to multi-fiber connectors (such as MTP, MPO), and are compatible with ribbon cables and round cables, which can accommodate up to 16×16 or more fibers to meet the high-density cabling applications in the communication field, such as in a data center.

Figure 2:
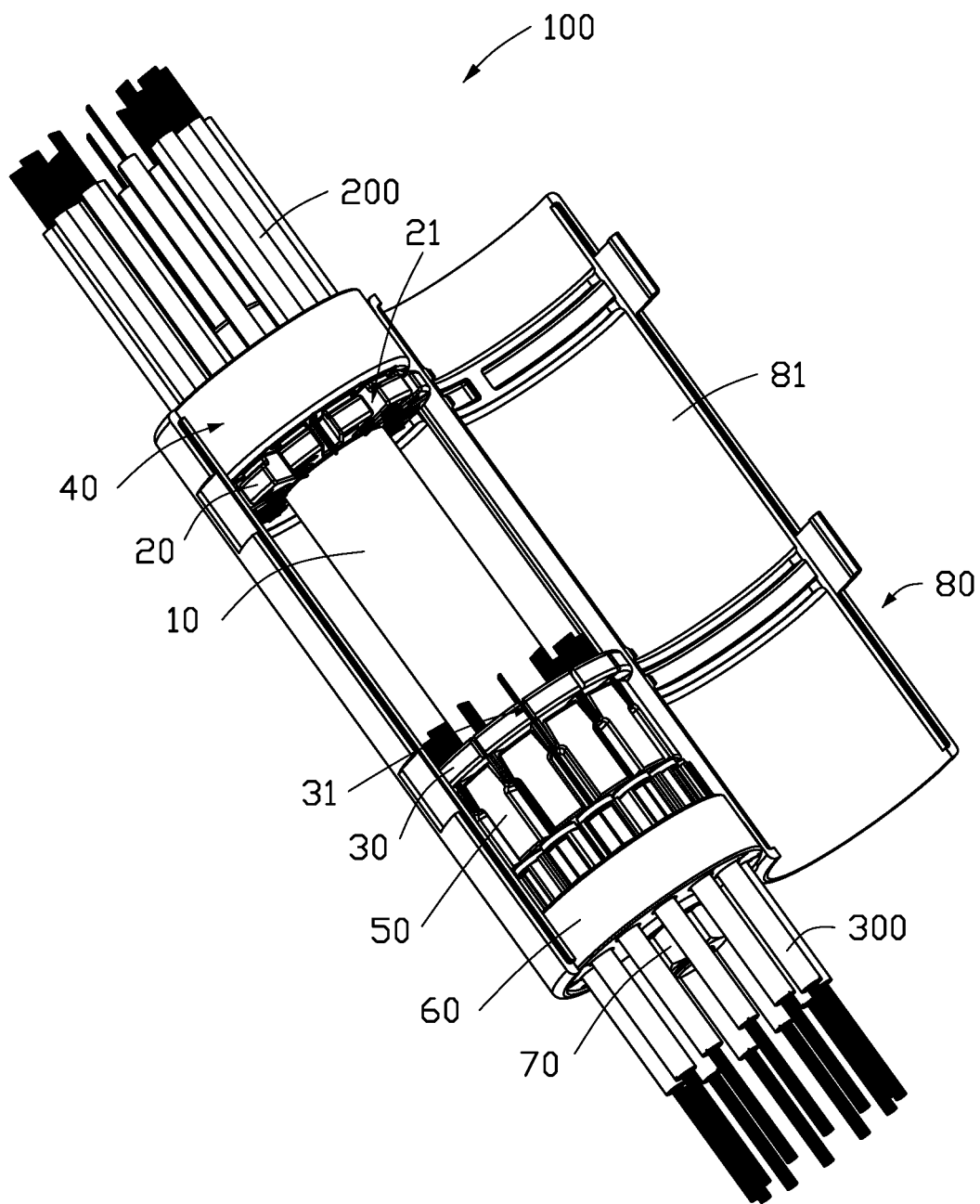
FIG. 2 is an isometric view of a first embodiment of an optical fiber shuffle.

FIG. 2 shows an embodiment of an optical fiber shuffle 100 for recombining a plurality of optical fibers 201 (e.g., shown in FIG. 4) of first optical cables 200 into second optical cables 300. The first optical cables 200 and the second optical cables 300 may be round cables or ribbon cables.

The optical fiber shuffle 100 includes a fixing rod 10, a first fixing plate 20, and a second fixing plate 30. The first fixing plate 20 and the second fixing plate 30 are respectively located at two ends of the fixing rod 10. The first fixing plate 20 is provided with a plurality of first fixing grooves 21 along an axial direction of the first fixing plate 20. The second fixing plate 30 is provided with a plurality of second fixing grooves 31 along an axial direction of the second fixing plate 30. Each of the first fixing grooves 21 is configured to fix the plurality of optical fibers 201 of the first optical cable 200. The plurality of optical fibers 201 is passed through one of the first fixing grooves 21, separated and wound around the fixing rod 10, and then fixed in a corresponding one of the second fixing grooves 31. The plurality of optical fibers 201 in the corresponding one of the second fixing grooves 31 is recombined to form the second optical cable 300.

In a first embodiment, the first fixing plate 20 is provided with twelve of the first fixing grooves 21. The second fixing plate 30 is provided with twelve of the second fixing grooves 31. The fiber array device 100 is connected to twelve of the first optical cables 200, which are recombined to form twelve of the second optical cables 300 for wiring of 12*12 optical cables. Of course, the fiber array device 100 can be backward compatible, for example, with wiring of 1*8, 8*8, or the like. In other embodiments, a number of the first fixing grooves 21 and a number of the second fixing grooves 31 may be increased to meet a higher number of wiring requirements.

The fixing rod 10 has a substantially cylindrical shape, but may also have other structural shapes, such as a prism.

Figure 3:
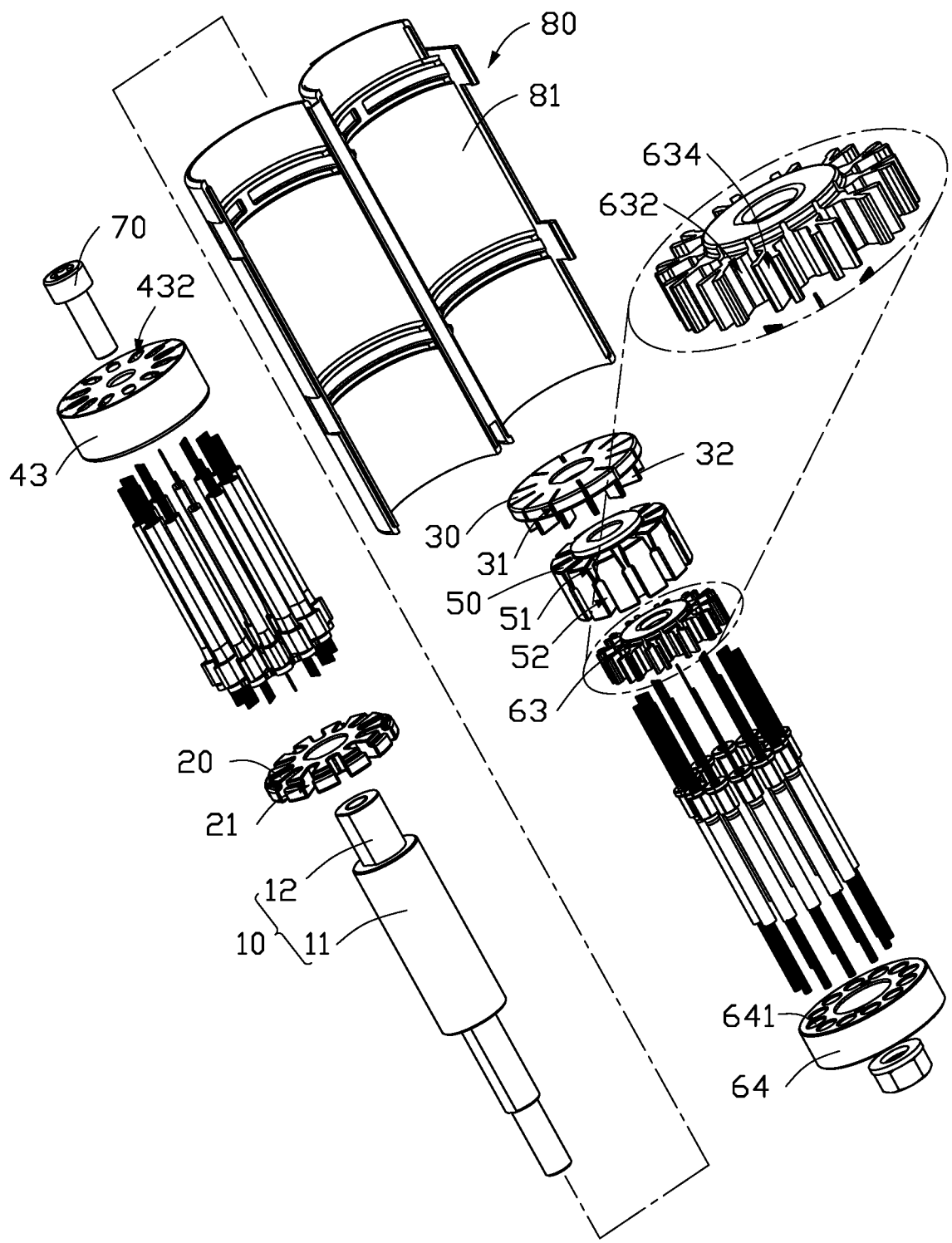
FIG. 3 is an exploded, isometric view of the optical fiber shuffle in FIG. 2.

Referring to FIG. 3, in the first embodiment, the fixing rod 10 includes a main body 11 and two connecting portions 12 respectively located at two ends of the main body 11. A diameter of the two connecting portions 12 is less than a diameter of the main body 11. Each of the two connecting portions 12 may be provided with an external thread (not shown). Each of the first fixing plate 20 and the second fixing plate 30 may be provided with a fixing hole having an internal thread (not shown) to be screwed to one of the two connecting portions 12.

It can be understood that in other embodiments, the first fixing plate 20 and the second fixing plate 30 may be fixed to the fixing rod 10 in other manners, such as by being integrally formed.

In the first embodiment, the optical fiber shuffle 100 further includes a positioning assembly 40. The positioning assembly 40 is configured to position the first optical cable 200.

Figure 4:
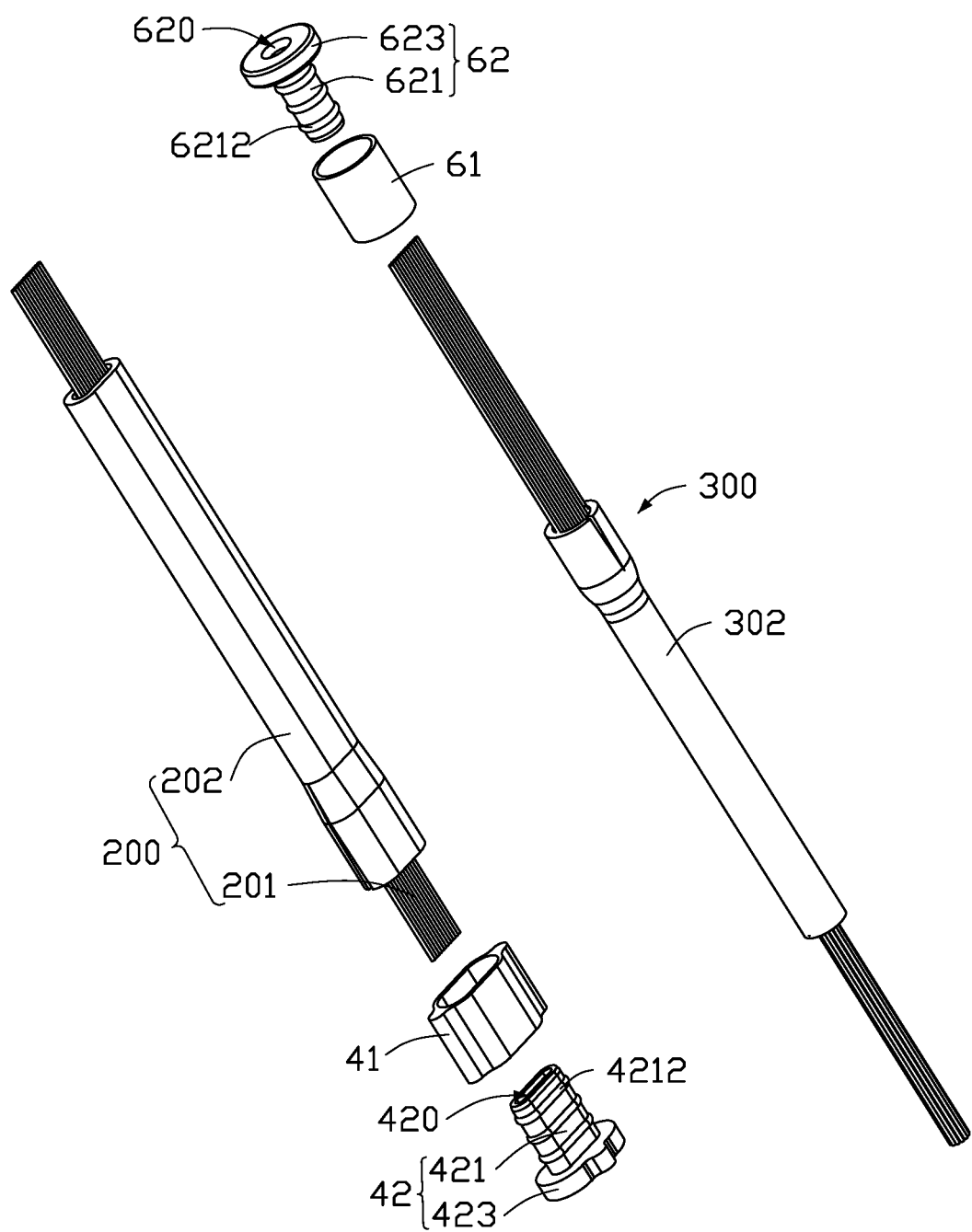
FIG. 4 is an exploded view of a sleeve, a rivet, a first optical cable, and a second optical cable.

Referring to FIG. 4, the positioning assembly 40 includes a sleeve 41 and a rivet 42. The rivet 42 is configured to be inserted into an outer skin 202 of the first optical cable 200. The sleeve 41 is sleeved outside the outer skin 202 of the first optical cable 200 and cooperates with the rivet 42 to fix the first optical cable 200.

The positioning assembly 40 further includes a positioning block 43. The positioning block 43 has a substantially cylindrical shape. The positioning block 43 is provided with a plurality of positioning holes 432. Each of the positioning holes 432 is configured to receive and position one of the first optical cables 200.

In the first embodiment, the rivet 42 includes an insertion end 421 and a fixing end 423 connected to the insertion end 421. A width of the fixing end 423 is larger than a width of the insertion end 421. The insertion end 421 is configured to be inserted into the outer skin 202 of the first optical cable 200. The rivet 42 is provided with a through hole 420 passing through the insertion end 421 and the fixing end 423. The plurality of optical fibers 201 passes through the through hole 420. The sleeve 41 is sleeved on the outer skin 202 and the insertion end 421. One end of the sleeve 41 is attached to the fixing end 423.

In the first embodiment, a peripheral wall of the insertion end 421 is provided with a plurality of protrusions 4212. The protrusions 4212 protrude from the peripheral wall of the insertion end 421 for increasing an interference fit between the sleeve 41 and the outer skin 202 of the first optical cable 200.

Referring to FIG. 3, in the first embodiment, the second fixing plate 30 further includes a plurality of pairs of clamping plates 32. The plurality of pairs of clamping plates 32 are located at one end of the second fixing plate 30 facing away from the first fixing plate 20. The two clamping plates of the pairs of clamping plates 32 are tapered and inclined toward each other. Each of the pairs of clamping plates 32 defines one of the second fixing grooves 31 therebetween, and each of the pairs of clamping plates 32 clamps the plurality of optical fibers 201 passed through one of the second fixing groove 31.

In the first embodiment, the optical fiber shuffle 100 further includes a fastener 50. The fastener 50 has a substantially cylindrical shape. The fastener 50 is sleeved on one of the connecting portions 12 of the fixing rod 10. The fastener 50 is provided with a plurality of chutes 51 opening toward one end of the second fixing plate 30. Each of the chutes 51 is configured to receive one corresponding pair of clamping plates 32. A width of the chutes 51 gradually narrows along a direction away from the second fixing plate 30. When the fastener 50 is moved toward the second fixing plate 30, an inner wall of the chute 51 presses two clamping plates of the pairs of clamping plates 32 to clamp the plurality of optical fibers 201. When the fastener 50 is moved away from the second fixing plate 30, the inner wall of the chute 51 releases the two clamping plates of the pairs of clamping plates 32 to release the plurality of optical fibers 201.

In the first embodiment, the fastener 50 is further provided with a plurality of clearance grooves 52 respectively connected to the plurality of chutes 51. One end of the clearance groove 52 passes through one end of the fastener 50 facing away from the chute 51, and another end of the clearance groove 52 is connected to the corresponding chute 51. The clearance groove 52 is used to pass the plurality of optical fiber 201 therethrough. It can be understood that in other embodiments, the chute 51 can penetrate both ends of the fastener 50, so that the clearance grooves 52 can be omitted.

Referring to FIG. 4, the optical fiber shuffle 100 further includes a fixing mechanism 60 (e.g., shown in FIG. 1). The fixing mechanism 60 includes a sleeve 61 and a rivet 62. The rivet 62 is configured to be inserted into an outer skin 302 of the second optical cable 300. The sleeve 61 is configured to be sleeved outside the outer skin 302 and cooperate with the rivet 62 to fix the second optical cable 300.

In the first embodiment, the rivet 62 includes an insertion end 621 and a fixing end 623. A diameter of the fixing end 623 is larger than a diameter of the insertion end 621. The insertion end 621 is configured to be inserted into the outer skin 302 of the second optical cable 300. The rivet 62 is provided with a through hole 620 passing through the insertion end 621 and the fixing end 623. The plurality of optical fibers 201 passes through the through hole 620. The sleeve 61 is sleeved on the outer skin 302 and the insertion end 621. One end of the sleeve 61 is attached to the fixing end 623.

In the first embodiment, a peripheral wall of the insertion end 621 is provided with a plurality of protrusions 6212. The protrusions 6212 protrude from the peripheral wall of the insertion end 621 for increasing an interference fit between the sleeve 61 and the outer skin 302 of the second optical cable 300.

The fixing mechanism 60 further includes a fixing ring 63. The fixing ring 63 is sleeved on one of the connecting portions 12 and located at one end of the fastener 50 facing away from the second fixing plate 30.

A plurality of clamping grooves 632 are defined in a peripheral wall of the fixing ring 63. Each of the clamping grooves 632 is configured to clamp a corresponding one of the sleeves 61 to fix one of the second optical cables 300. A shape of each clamping groove 632 is substantially U-shaped.

In the first embodiment, the fixing ring 63 is further provided with a plurality of retaining grooves 634. A shape of each retaining groove 634 is substantially V-shaped. Each of the retaining grooves 634 is located between two adjacent clamping grooves 632. When one of the sleeves 61 is clamped by one of the clamping grooves 632, sidewalls of the one of the clamping grooves 632 are biased toward the retaining grooves 634. Thus, the U-shaped clamping grooves 632 can be combined with the V-shaped retaining grooves 634 to simplify adjustment of a cable clamping force for clamping round cables or ribbon cables.

In the first embodiment, the fastener 50 is further provided with a positioning rod (not shown). The fixing ring 63 is sleeved on the positioning rod for positioning and rotating along with the fastener 50.

In the first embodiment, the fixing mechanism 60 further includes a positioning ring 64. The positioning ring 64 is sleeved on one of the connecting portions 12 and located at one end of the fixing ring 63 facing away from the fastener 50. The positioning ring 64 is provided with a plurality of positioning holes 641. The second optical cables 300 respectively pass through the positioning holes 641, and the positioning holes 641 position the second optical cables 300.

In the first embodiment, the positioning ring 64 is also sleeved on the positioning rod.

In the first embodiment, the optical fiber shuffle 100 further includes two locking members 70. Each of the locking members 70 is screwed to a respective one of the connecting portions 12. One of the locking members 70 cooperates with the second fixing plate 30 to clamp and lock the fastener 50, the fixing ring 63, and the positioning ring 64. Another one of the locking members 70 cooperates with the first fixing plate 20 to clamp and lock the positioning block 43.

It can be understood that in other embodiments, the two locking members 70 can be omitted, such that the fastener 50, the fixing ring 63, the positioning ring 64, and the positioning block 43 can be separately fastened to the connecting portions 12.

In the first embodiment, the optical fiber shuffle 100 further includes a housing 80. The housing 80 has a substantially cylindrical shape. The housing 80 is configured to sleeve on other components of the optical fiber shuffle 100.

Specifically, the housing 80 includes two housing bodies 81, each of the two housing bodies 81 having a semicircular cross-section. The two housing bodies 81 are pivotably connected at one side. The two housing bodies 81 can be rotated into a cylindrical shape to be clamped and fixed to the first fixing plate 20 and the second fixing plate 30.

It can be understood that the shapes of the sleeves 41 and 61, the rivets 42 and 62, the positioning holes 432, and the clamping grooves 632 can be respectively configured to be in an oblong shape, a cylindrical shape, or the like according to the shapes of the first optical cables 200 and the second optical cables 300.

Figure 5:
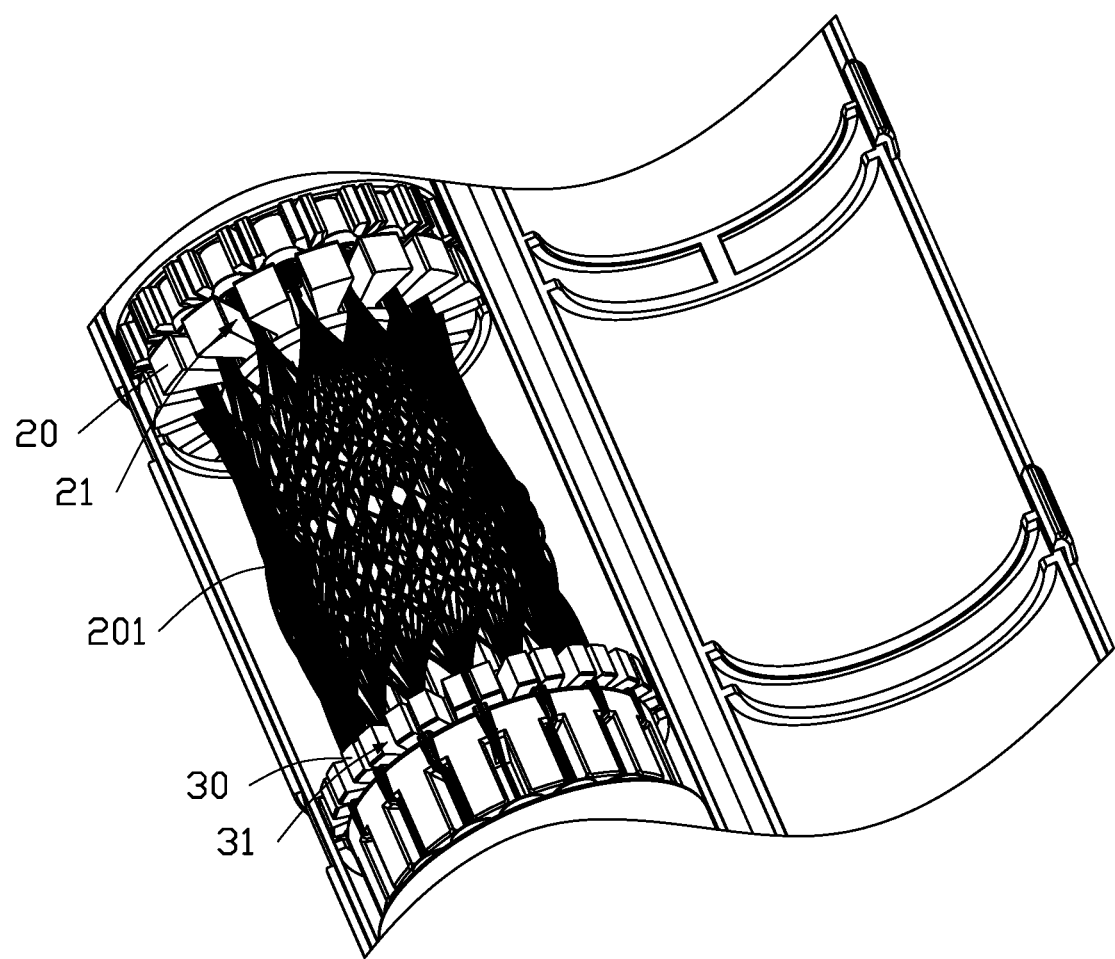
FIG. 5 is a schematic view of optical fibers recombined into a second optical cable.
Figure 6:
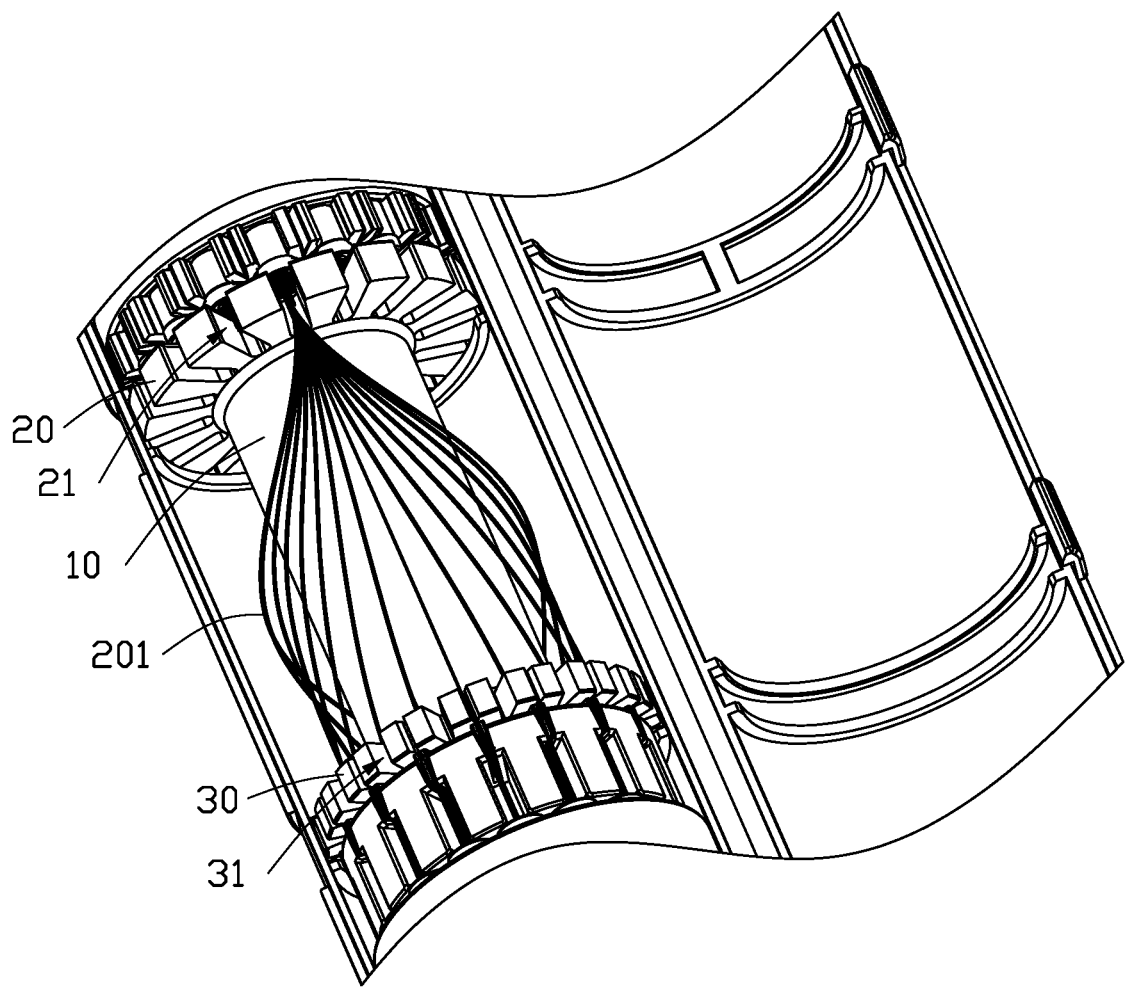
FIG. 6 is a schematic view of loading of a first optical cable.

Referring to FIG. 5 and FIG. 6, when the optical fiber shuffle 100 is assembled and used, the first fixing plate 20 and the positioning block 43 are sequentially loaded onto one of the connecting portions 12 of the fixing rod 10. A portion of the outer skin 202 adjacent to one end of the first optical cable 200 is stripped to expose the plurality of optical fibers 201 therein. The plurality of optical fibers 201 is inserted into the rivet 42, and the insertion end 421 of the rivet 42 is inserted into the outer skin 202 of the first optical cable 200. The sleeve 41 is sleeved on the outer skin 202 and the insertion end 421. Next, the plurality of optical fibers 201 is passed through one of the positioning holes 432 of the positioning block 43 and moved to fix the sleeve 41 in the one of the positioning holes 432. The plurality of optical fibers 201 is then passed through one of the first fixing grooves 21, separated on the fixing rod 10, passed through a corresponding one of the second fixing grooves 31, and fixed by a corresponding one of the pairs of clamping plates 32. Others of the first optical cables 200 are operated as above until the plurality of optical fibers 201 from each of the first optical cables 200 is fixed in a corresponding one of the second fixing grooves 31. Thereafter, the fastener 50 is sleeved over the connecting portion 12 to cause the clamping plates of the pairs of clamping plates 32 to clamp the plurality of optical fibers 201. After the outer skin 302 of the second optical cable 300 (in this case, an empty casing) is received in the rivet 62 and the sleeve 61, the outer skin 302 is sleeved on the plurality of optical fibers 201 in the corresponding one of the second fixing grooves 31 to form one of the second optical cables 300. Next, the fixing ring 63 is sleeved on the connecting portion 12 and the sleeve 61 is clamped by one of the clamping grooves 632 of the fixing ring 63 to fix the second optical cable 300. Then, the positioning ring 64 is loaded and the second cable 300 is passed through one of the positioning holes 641 of the positioning ring 64. Finally, the two locking members 70 are loaded to lock the above components and the housing 80 is clamped shut to complete assembly.

Compared with the related art, the optical fiber shuffle 100 performs wiring by winding the plurality of optical fibers 201 on the fixing rod 10, so that an occupied space is reduced. The fixing rod 10 is capable of limiting a minimum bend radius of the optical fibers 201 to prevent the optical fibers 201 from breaking. The plurality of first fixing grooves 21 and the plurality of second fixing grooves 31 can be combined to realize various wiring structures.

Further, each of the second optical cables 300 is clamped by one of the plurality of clamping grooves 632, and a strength of a clamping force of the clamping groove 632 can be adjusted by adjusting a size of the retaining groove 634. Thus, the U-shaped clamping grooves 632 can be combined with the V-shaped retaining grooves 634 to simplify adjustment of a cable clamping force for clamping round cables or ribbon cables.

Further, the plurality of chutes 51 of the fastener 50 biases the tapered two clamping plates of the pairs of clamping plates 32 to clamp the plurality of optical fibers 201, which combined with the locking screw 70, eliminates the need for gluing, thereby simplifying the manufacturing process.

Figure 7:
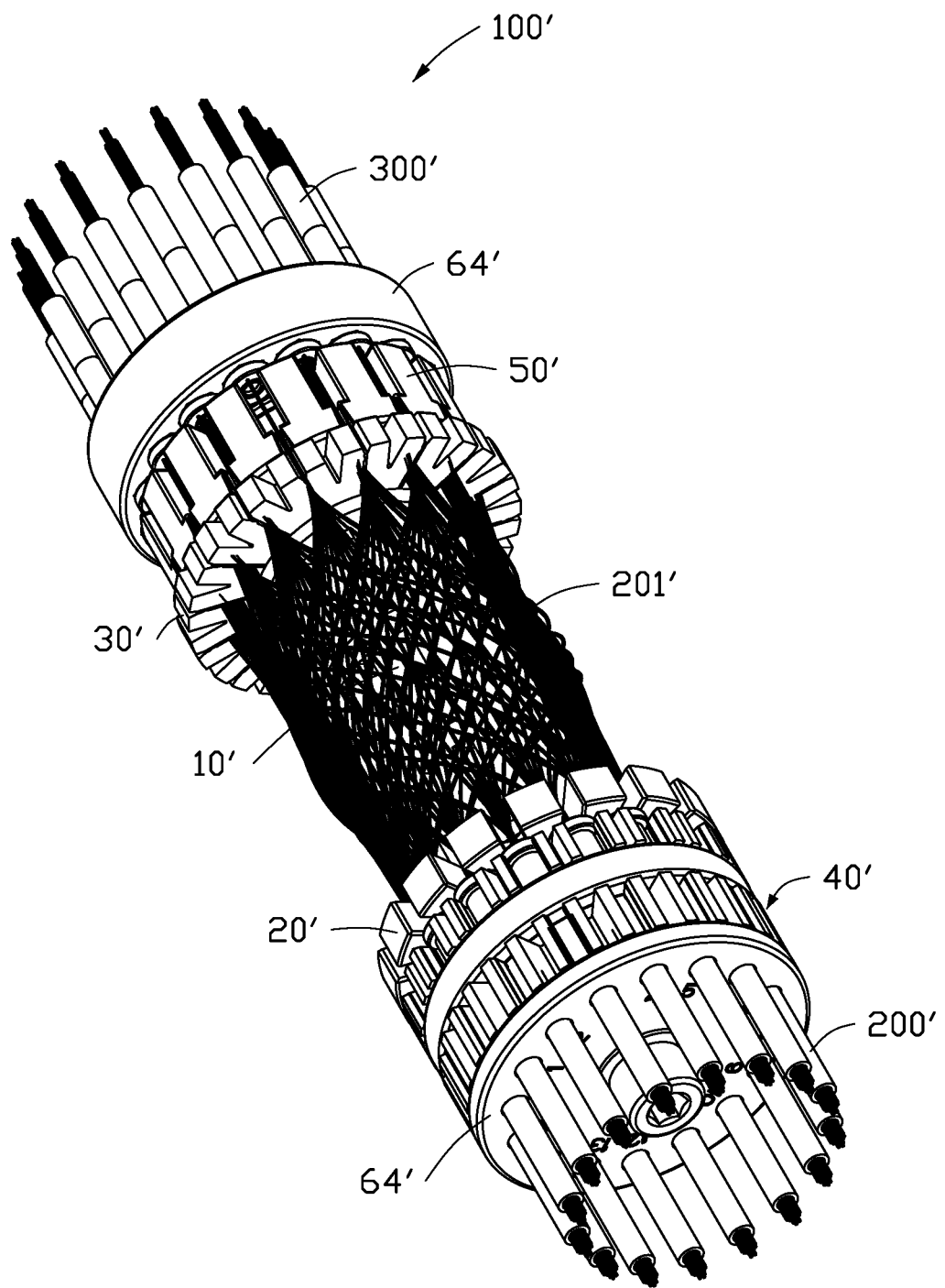
FIG. 7 is an isometric view of a second embodiment of the optical fiber shuffle.
Figure 8:
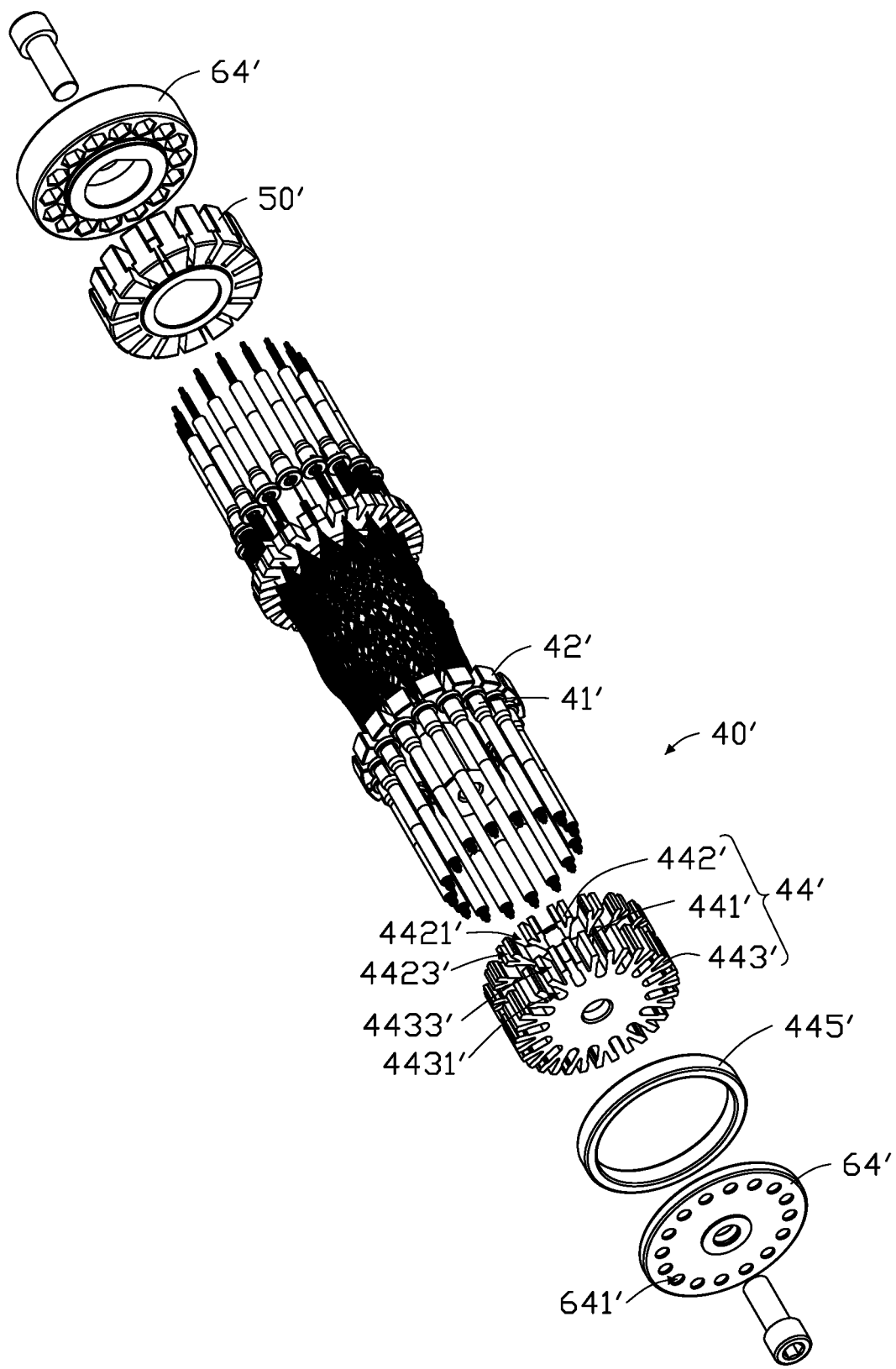
FIG. 8 is an exploded view of the optical fiber shuffle in FIG. 7.

FIGS. 7 and 8 show a second embodiment of an optical fiber shuffle 100' for recombining a plurality of optical fibers 201' of a first optical cable 200' to form a second optical cable 300'.

The optical fiber shuffle 100' has substantially the same structure as the optical fiber shuffle 100 of the first embodiment. The optical fiber shuffle 100' of the second embodiment includes a fixing rod 10' and a first fixing plate 20' and a second fixing plate 30' respectively provided at two ends of the fixing rod 10'. The optical fiber shuffle 100' further includes a positioning assembly 40'. The positioning assembly 40' is located adjacent to one end of the first fixing plate 20' for positioning the first optical cables 200'. The positioning assembly 40' includes a sleeve 41', a rivet 42', and a fixing ring 44'.

The fixing ring 44' includes a shaft body 441', a first fixing portion 442', and a second fixing portion 443'. The first fixing portion 442' and the second fixing portion 443' are axially spaced apart on the shaft body 441'.

A plurality of clamping grooves 4421' are provided on a peripheral wall of the first fixing portion 442'. Each of the plurality of clamping grooves 4421' is for clamping a corresponding one of the sleeves 41' to fix one of the first optical cables 200'.

The first fixing portion 442' further includes a retaining groove 4423' between each two adjacent clamping grooves 4421'. When the sleeve 41' is clamped by one of the clamping grooves 4421', sidewalls of the clamping grooves 4421' are biased toward the retaining grooves 4423'.

A structure of the second fixing portion 443' is substantially similar to a structure of the first fixing portion 442'. The second fixing portion 443' includes a plurality of clamping grooves 4431' and a plurality of retaining grooves 4433' located respectively between each adjacent two clamping grooves 4421'. The first fixing portion 442' differs from the second fixing portion 443' in that a bottom of the clamping groove 4421' has a substantially cylindrical shape for clamping a cylindrical sleeve 41', while a bottom of the clamping groove 4431' has a substantially flat shape for clamping a flat sleeve 41'. A shape of the sleeves 41' is changed according to a shape of the cables.

When one of the clamping grooves 4421' or the clamping grooves 4431' clamps one of the sleeves 41', the optical cables or the plurality of optical fibers 201' pass through the other one of the clamping grooves 4431' or the clamping grooves 4421'.

In the second embodiment, the fixing ring 44' further includes a limiting ring 445'. The limiting ring 445' is sleeved on the shaft body 441' and located between the first fixing portion 442' and the second fixing portion 443' and is used for limiting the optical cables passing through.

A positioning ring 64' is provided on an outer side of the fixing ring 44'. The positioning ring 64' is provided with a plurality of positioning holes 641'. The plurality of positioning holes 641' is configured to receive and position the first optical cables 200'.

A fastener 50' and another positioning ring 64' are located on one side of the second fixing plate 30'. Specific structures and functions of the fastener 50' and the positioning ring 64' are the same as those of the fastener 50 and the positioning ring 64 of the first embodiment, and will not be described further.

The present disclosure is compatible with ribbon cables and round cables, can accommodate up to 16×16 or more Fibers cabling, and is backward compatible with applications such as 1×8, 1×16, and 8×8. The fibers in the cylindrical array wiring design are arranged around a cylindrical structure (which can be evolved into wiring around a quadrangular prism, a hexagonal prism, an octagonal prism, etc.) Furthermore, the one-piece snap-in housing design simplifies the shuffle packaging structure.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical fiber shuffle for recombining a plurality of optical fibers of a first optical cable into a second optical cable, the optical fiber shuffle comprises:
   a fixing rod;
   a first fixing plate defining a plurality of first fixing grooves, the plurality of first fixing grooves configured to respectively receive the plurality of optical fibers of the first optical cable; and
   a second fixing plate defining a plurality of second fixing grooves, the plurality of second fixing grooves configured to respectively receive the plurality of optical fibers of the first optical cable after the plurality of optical fibers are wound around the fixing rod and recombined into the second optical cable; wherein:
   the first fixing plate and the second fixing plate are respectively located at two ends of the fixing rod.

2. The optical fiber shuffle of claim 1, wherein:
   the second fixing plate further comprises a plurality of pairs of clamping plates;
   the plurality of pairs of clamping plates are located at one end of the second fixing plate facing away from the first fixing plate;
   each of the plurality of pairs of clamping plates defines one of the plurality of second fixing grooves therebetween; and
   each of the plurality of pairs of clamping plates clamps the plurality of optical fibers passed through the one of the plurality of second fixing grooves.

3. The optical fiber shuffle of claim 2, further comprising a fastener, wherein:
   the fastener is sleeved on the fixing rod;
   the fastener defines a plurality of chutes opening toward one end of the second fixing plate;
   each of the plurality of chutes is configured to receive one corresponding pair of clamping plates;
   a width of the chutes gradually narrows along a direction away from the second fixing plate;
   when the fastener is moved toward the second fixing plate, an inner wall of the chute presses the pair of clamping plates to clamp the plurality of optical fibers.

4. The optical fiber shuffle of claim 1, further comprising a fixing mechanism, wherein:
   the fixing mechanism comprises a sleeve and a rivet;
   the rivet is configured to be inserted into an outer skin of the second optical cable; and
   the sleeve is sleeved outside the outer skin of the second optical cable and cooperates with the rivet to fix the second optical cable.

5. The optical fiber shuffle of claim 4, wherein:
   the fixing mechanism further comprises a fixing ring sleeved on the fixing rod;
   a plurality of clamping grooves is defined in a peripheral wall of the fixing ring; and
   each of the plurality of clamping grooves is configured to clamp a corresponding one of the sleeves to fix one of the second optical cables.

6. The optical fiber shuffle of claim 5, wherein:
   the fixing ring further defines a plurality of retaining grooves;
   each of the plurality of retaining grooves is located between two adjacent clamping grooves; and
   when the one of the sleeves is clamped by one of the plurality of clamping grooves, sidewalls of the clamping groove are biased toward the retaining grooves.

7. The optical fiber shuffle of claim 4, wherein:
   the rivet comprises an insertion end and a fixing end coupled to the insertion end;
   the insertion end is configured to be inserted into the outer skin of the second optical cable;
   the sleeve is sleeved on the outer skin of the second optical cable and the insertion end; and
   a peripheral wall of the insertion end is provided with a plurality of protrusions.

8. The optical fiber shuffle of claim 5, wherein:
   the fixing mechanism further comprises a positioning ring sleeved on the fixing rod;
   the positioning ring defines a plurality of positioning holes passing through the positioning ring; and
   each of the second optical cables respectively passes through one of the plurality of positioning holes, and the positioning holes position the second optical cables.

9. The optical fiber shuffle of claim 8, further comprising a locking member, wherein:
   the locking member is screwed onto the fixing rod;
   the locking member cooperates with the second fixing plate to clamp and lock the fixing ring and the positioning ring.

10. The optical fiber shuffle of claim 1, further comprising a housing, wherein:

the housing comprises two housing bodies each having a semicircular cross-section;

the two housing bodies are pivotably coupled at one side;

the two housing bodies are configured to be rotated into a cylindrical shape to be clamped and fixed to the first fixing plate and the second fixing plate.

11. The optical fiber shuffle of claim 7, wherein:

a width of the fixing end is larger than a width of the insertion end;

the rivet defines a through hole passing through the insertion end and the fixing end;

the plurality of optical fibers passes through the through hole.

12. The optical fiber shuffle of claim 3, wherein:

the fastener defines a plurality of clearance grooves respectively coupled to the plurality of chutes;

one end of the clearance groove passes through one end of the fastener facing away from the chutes, and another end of the clearance groove is coupled to the corresponding chute;

the plurality of optical fibers passes through the clearance grooves.

\* \* \* \* \*